United States Patent [19]

Demas

[11] 4,363,085
[45] Dec. 7, 1982

[54] SCAN SYNTHESIZED BEAM HEADLAMP

[75] Inventor: Nickolas P. Demas, Cranford, N.J.

[73] Assignee: Edison International, Inc., Rolling Meadows, Ill.

[21] Appl. No.: 146,683

[22] Filed: May 5, 1980

[51] Int. Cl.$^3$ ................................................ F21V 7/00
[52] U.S. Cl. ...................................... 362/283; 362/80; 362/284; 362/296; 362/297; 362/324; 362/362
[58] Field of Search ............... 362/283, 284, 296, 297, 362/324, 362, 80

[56] References Cited

U.S. PATENT DOCUMENTS 3,139,604 6/1964 Meiners et al. ................. 362/284 X
4,153,926 5/1979 Hurt ..................................... 362/35

Primary Examiner—Stephen J. Lechert, Jr.
Attorney, Agent, or Firm—Ronald J. La Porte; Jon C. Gealow; Charles W. MacKinnon

[57] ABSTRACT

A vehicle headlamp is provided wherein one or more reflectors scan a collimated beam of light to generate a desired light beam pattern and project it to the road. Electrical and mechanical driver means are also provided to change the mode of operation of the scanning reflector to change the pattern of light and its location on the road.

15 Claims, 10 Drawing Figures

SCAN SYNTHESIZED BEAM HEADLAMP

BACKGROUND OF THE INVENTION

Headlamps for use in automobiles and other vehicles have conventionally used a prismatic lense to transmit and shape the collimated beam from a point-light source in a reflector to achieve specified light beam patterns and intensities.

SUMMARY OF THE INVENTION

In accordance with the present invention a vehicle headlamp is provided whereby the desired headlamp light beam pattern and intensities are generated by scanning a collimated beam of light which preferably is a pencil beam. To this end a light source is positioned within a suitable reflector so that a small-diameter, generally collimated beam of light is produced. At least one lightweight scanning reflector is positioned to interrupt this beam of light and to direct it to a desired location. By changing the scanning reflector's angular position relative to the beam, the beam of light may be directed to any desired location. Therefore, when the scanning reflector is oscillated, the beam itself is swept and can illuminate a larger area than that projected on the scanning reflector.

If an area is swept repeatedly at a rapid enough rate, this area will be perceived by a vehicle operator as if continuously illuminated. Further, when the length of time that the beam dwells on a particular area is varied, the apparent intensity of illumination with the sectors of the swept area will also be varied. Thus various beam patterns and intensities can be achieved over the selected areas simply by control of the movement of the scanning reflector.

An object of this invention is to provide a single aperture vehicle headlamp which generates the high and low-beam patterns required by the specifications for automobile headlamps in place of the dual headlamps customarily used.

A second object of the invention is to provide a vehicle headlamp which generates a plurality of beam patterns which may be automatically or manually controlled to change the aim of the beam pattern to compensate for change in attitude of the vehicle such as occurs at the top of a hill or on a curve or as occasioned by change in load.

A further object is the elimination of the heretofore utilized large headlamp lenses in order to provide designers with greater flexibility of design and to provide beams of variable intensity.

Finally, it is an object of this invention to allow the use of different sources of light besides the tungsten filament or tungsten-halide lamps now in common usage.

These and other advantages are achieved in accordance with the present invention by means of a vehicle headlamp comprising a source of light which may generate a point or non-point beam of light and a reflector that projects a collimated beam of light to a scanning reflector to cover part or the entire area of the scanning reflector. The scanning reflector is oscillated preferably about its vertical and horizontal axis to project the desired beam pattern and its location on the road.

The scanning reflector may be oscillated by any conventional means such as transducers, galvanometric or servo-motors that are known to be capable of oscillating a member such as the scanning reflector which may be a mirror at a cyclic rate of at least about 24 cycles a second to provide a continuous and larger area of light on the road than that projected by the scanning reflector when held stationary in a single position relative to the collimated beam of light projected by the scanning reflector.

The angular excursion of the scanning reflector will determine the area and location of the light beam projected on the road. If the scanning reflector has its reflective surface held in a vertical plane and the vertical plane of the reflective surface is oscillated plus ten degrees in one direction relative to a vertical reference plane and minus ten degrees in a second direction relative to such vertical reference plane, the beam projected on the road will have a greater width than that projected by the vertical plane of the reflective surface which is oscillated through an angular excursion of plus and minus five degrees relative to the same vertical reference plane for a given beam of collimated light projected to the scanning reflector. In like manner, if the vertical plane of the reflective surface is oscillated through an angular excursion of plus and minus ten degrees relative to a horizontal reference plane, the length of the beam projected on the road will be greater than that projected when the vertical plane of the reflective surface is oscillated through an angular excursion of plus and minus five degrees for a given beam of collimated light.

In order to shift from a high beam to a low beam, the oscillation may for example be changed from an angular excursion of plus and minus ten degrees relative to a horizontal reference plane to plus five degrees and minus ten degrees. It will be appreciated that the plus degree of angular excursion in this example is that which tilts the beam upwardly relative to the horizontal reference plane and the minus degree of angular excursion is that which tilts the beam downwardly relative to the horizontal reference plane. A decrease in the plus angular excursion results in lowering the projected beam on the road.

It will also be understood that a change from high to low beam may be effected by changing the aim of the beam projected from the scanning reflector without any change in the angular excursion. If a high beam is generated by oscillating the scanning reflector plus and minus five degrees relative to a given horizontal reference plane, a low beam will be generated by oscillating the scanning reflector through an angular excursion of plus and minus five degrees relative to a plane positioned at a depressed angle such as thirty degrees to the original horizontal reference plane. In this example the angular excursion of the oscillating scanning reflector is the same for the high and low beam and the low beam is generated by lowering the aim of the beam projected to the road.

If the collimated beam projected to the scanning reflector is a pin point of light the scanning reflector is oscillated at a rapid rate to cause the pin point of light to move across the reflector in a plurality of parallel horizontal lines in a raster pattern similar to the way in which a television picture is generated for projecting a continuous beam of light on the road. If the collimated beam of light projected to the scanning reflector has an area greater than a pin point of light, the scanning oscillation may be adjusted in conventional manner to project the desired continuous beam of light to the road. In general intensity of the projected beam of light may be increased by increasing the dwell time of the scanning reflector on each small segment of the projected beam and the size of the area covered is determined by the angular excursion of the oscillating scanning reflector.

Best results are achieved by driver means that automatically adjust one or more of the parameters of speed of oscillation, aim of the beam or angular excursion. The driver means may comprise a conventional function generator, servo-motors, magnetic tape, etc. and if desired the driver means may constitute simple conventional mechanical means for changing the aim of the beam or a combination of mechanical and electrical devices may be used for controlling the scanning reflector.

For example, a function generator if employed as the driver means may selectively provide two separate signals to a pair of transducers. The signal of the function-generator may be square wave, sine wave, sawtooth or triangular wave to provide a plurality of functions in known manner. The wave form may be amplitude or frequency modulated or may simply have a high frequency on-off switch. The function generator may change the speed of oscillation to change the light intensity and change the angular excursion or aim of the projected beam to change its location on the road.

Alternatively, the scanning reflector may be driven at a constant speed and constant angular excursion for example by a pair of transducers. In such cases, the aim of the beam may be changed by tilting it up or down or by rotating it relative to the road by means of conventional control cables operated from the dashboard which tilt or rotate the mount of the scanning reflector. When the mount tilts the scanning reflector upwardly, a high beam is projected on the road and when the mount is rotated the projected beam will follow the road in going around a curve.

Tilting the aim of the scanning reflector up or down may be used to compensate for a change in the attitude of the vehicle. The aim of the projected beam will tend to be elevated by a heavy rear load on the vehicle or when the vehicle goes over the top of a hill. The projected beam will be lowered to the desired place on the road by means of the function generator or manually by control cables.

Automatic change in the aim of the projected beam in going around curves may be provided by mechanical driver means. This may be done by convention mechanical linkage which couples the steering knuckle to the mount of the scanning reflector so that the mount will rotate and change the aim of the beam to follow the road around curves as the wheels are turned back and forth. Alternatively the driver means for changing the aim of the beam on curves may comprise a variable capacitance or variable resistance mechanically coupled to the steering knuckle by conventional linkage so that as the wheels turn the variable capacitance or resistance will generate a signal that is transmitted to servo motors or to a function generator adapted to respond and change the aim of the beam to follow curves in the road.

The aim of the beam on the road for shifting the beam up and down for change in attitude of the vehicle occasioned by heavy rear vehicle loads or in topping a hill may be changed automatically by means of a gravity pendulum mechanically linked in conventional manner to a variable capacitance or variable resistance whereby a signal is generated when the pendulum shifts from a vertical position with change in attitude of the vehicle. A shift in position of the gravity pendulum changes the variable capacitance or resistance to generate a signal transmitted in known manner to a function generator or servo-motor which in turn causes the scanning reflector to change its aim of the projected beam up or down to compensate for the change in attitude of the vehicle. If desired the signal generated by the gravity pendulum may also be used to change the angular excursion of the scanning reflector.

Further details of the present invention will be readily understood by reference to the drawings in which:

FIG. 2 is a top view of the scanning reflector assembly shown in FIG. 1.

FIG. 5 is a front view of a scanning reflector and FIG. 6 is a top view of the assembly which includes a top view of the scanning reflector of FIG. 5.

Figure 1:
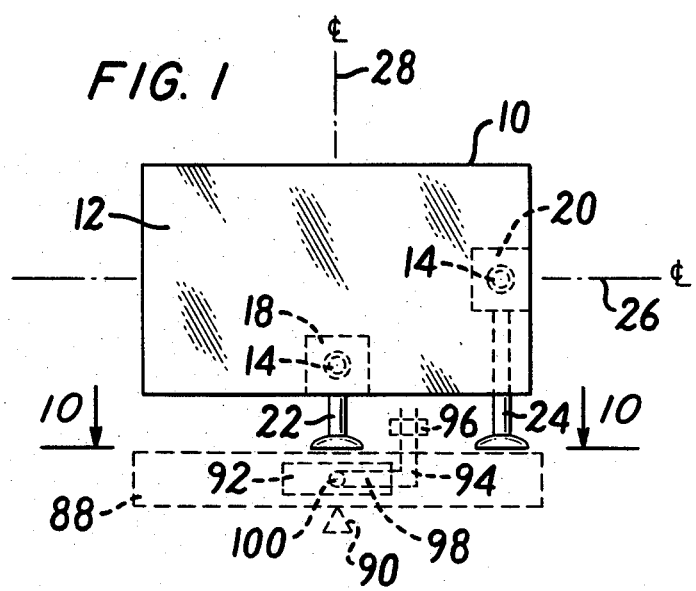
FIGS. 1 & 2 illustrate one way in which the scanning reflector of the present invention may be actuated by a pair of transducers and one way in which the aim of the beam projected by the scanning reflector may be changed.
Figure 2:
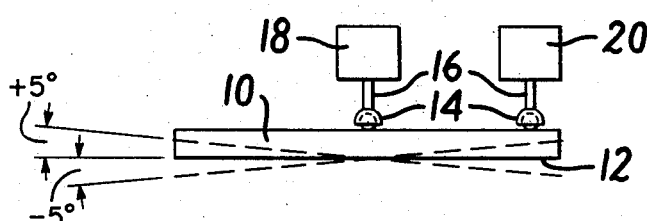

Referring now to FIGS. 1 and 2 of the drawings, the scanning reflector is a mirror 10 having a planar reflective surface 12. The mirror is mounted by means of ball and socket connections 14 connected in any convenient manner at 16 to each of two conventional transducers 18 and 20 respectively which are transducers of the type having reciprocating coil motors. For convenience of description, the planar reflective surface 12 of the mirror 10 is shown mounted in a vertical plane (FIG. 2) by means of the transducers which are supported in any convenient manner as by stanchions 22 and 24 respectively.

The ball and socket connector 14 of transducer 20 is most conveniently positioned on the horizontal centerline of mirror 10 as indicated at 26 and the ball and socket connector 14 of transducer 18 is positioned on the vertical centerline of mirror 10 as indicated at 28. When activated by a conventional electric circuit (not shown), the coil motor of transducer 20 will reciprocate and cause the mirror to oscillate relative to a vertical reference plane such as the vertical plane of the reflective surface 12 shown in FIG. 2 which is a top view of the mirror scanning reflector of FIG. 1. Transducer 20 will cause the mirror to pivot on the ball and socket connector 14 of transducer 18 which is mounted on the vertical centerline 28 and the angular excursion for the purpose of illustration is shown as plus and minus five degrees by the dotted lines in FIG. 2 relative to the vertical reference plane of the reflective surface 12 of the mirror scanning reflector 10.

Figure 3:
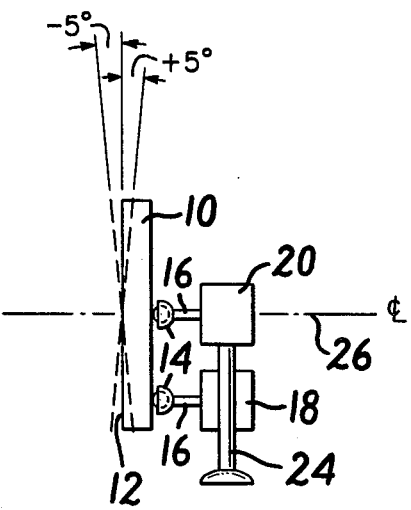
FIG. 3 is a side view of the scanning reflector of FIG. 1 viewed from the right hand side of FIG. 1.
Figure 4:
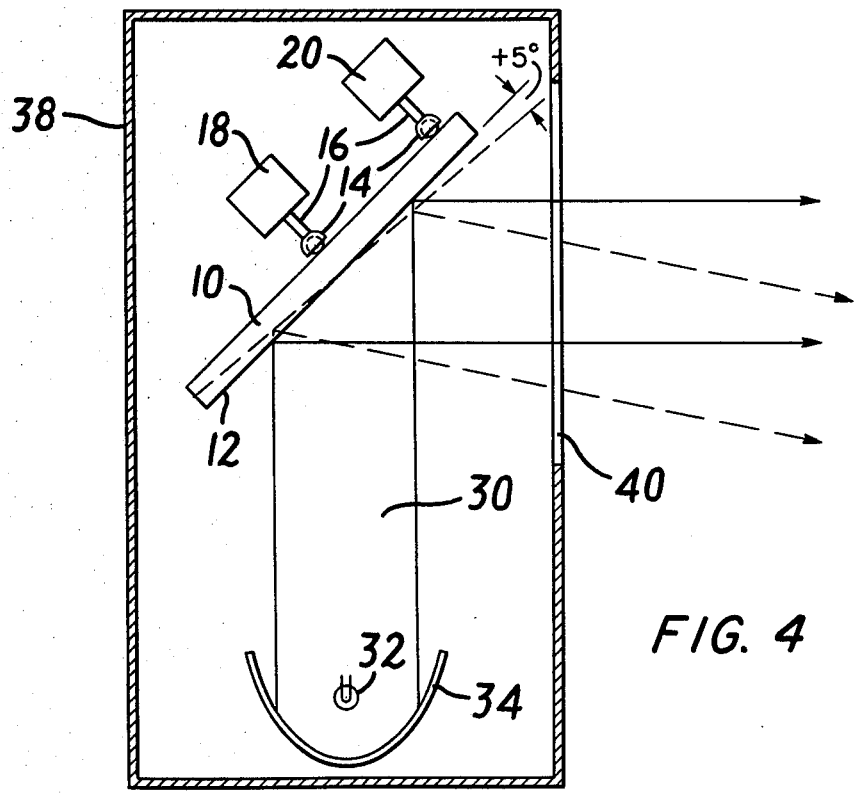
FIG. 4 is a top view of the scanning reflector of FIG. 1 which illustrates one way in which the vehicle headlamp of the present invention may be assembled in a vehicle.

As best shown in FIG. 4, a collimated pin point beam of light illustrated at 30 is projected to the mirror scanning reflector 10 by a conventional stationary halogen lamp 32 and reflector 34. The angular excursion of plus five degrees indicated in dotted lines in FIG. 3 causes the pin point collimated beam to travel horizontally across the scanning reflector and the width of the continuous beam projected on the road is determined by the angular excursion of the scanning reflector generated by transducer 20. An increase in angular excursion will increase the width of the beam projected on the road.

In similar manner, the length of the projected beam on the road and its location is controlled by transducer 18. Reciprocation of the coil motor of transducer 18 causes mirror 10 to pivot on the ball and socket connector 14 of transducer 20 and oscillate the mirror through a plus and minus angular excursion relative to a horizontal plane such as a horizontal plane through the centerline 26. As best shown by the angular excursion illustrated in dotted lines in FIG. 3, when the angular excursion is plus five degrees the projected beam tilts upwardly and when the angular excursion is minus five degrees the projected beam is tilted down. It will be appreciated that oscillation of mirror 10 by transducer 18 also causes the pin point beam of light to travel up and down the reflective surface of the mirror as viewed in FIG. 1 and this in combination with the horizontal travel generated by transducer 20 provides scanning and a continuous projected beam of light on the road. Mirror 10 is drive by the transducers 18 and 20 at a cyclic rate of at least about 24 cycles per second in order to generate the apparently continuous projected beam of light on the road. As illustrated in FIG. 4 the halogen lamp 32, collimated beam reflector 34, the scanning reflector 10 and transducers 18 and 20 may be assembled and enclosed in a suitable housing 38 having an aperture 40 for the beam projected by the scanning reflector. The housing 38 may be installed as a unit in a vehicle or alternatively a housing may be formed in the vehicle itself and the halogen lamp 32, reflector 34, the scanning reflector 10 and transducers 18 and 20 assembled in the vehicle housing.

Figure 5:
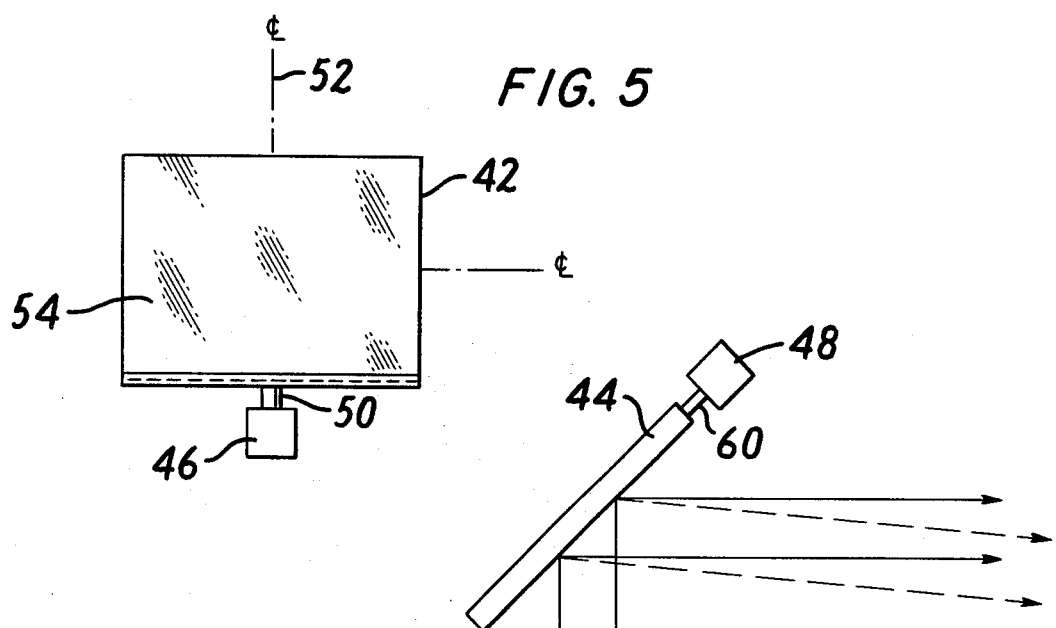
FIGS. 5 & 6 illustrate a second embodiment of the invention in which galvanometric oscillating motors are used to scan a collimated beam of light and project it on the road.
Figure 6:
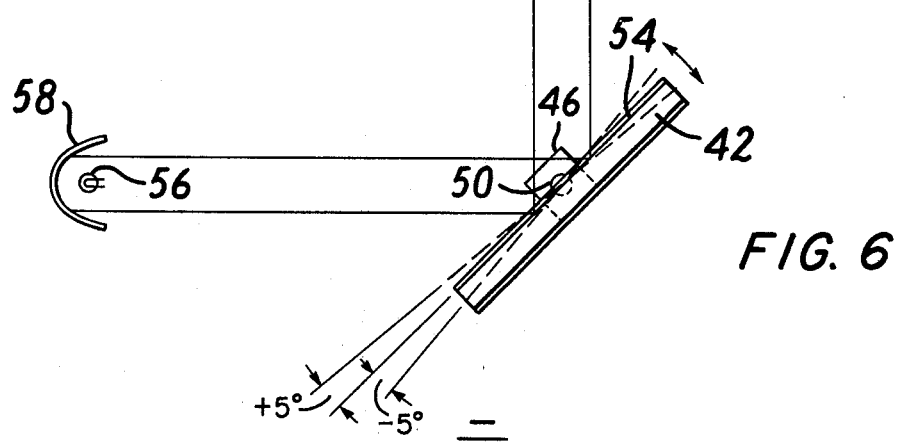

A second embodiment of the present invention is illustrated in FIGS. 5 & 6. As there shown, two mirror scanning reflectors 42 and 44 are oscillated by means of galvanometric motors 46 and 48 respectively. The driver 50 of motor 46 is connected at the centerline 52 of the scanning reflector 42 as illustrated in the front view of FIG. 5. Oscillation of driver 50 will move the reflective surface 54 of scanning reflector 42 through an angular excursion which may be plus and minus five degrees relative to the vertical plane of the reflective surface 54 as illustrated in dotted lines in FIG. 6 with respect to the top view of scanning reflector 42. The light from halogen lamp 56 is projected as a collimated beam of light by reflector 58 to the reflective surface 54 and the angular excursion of scanning reflector 42 will determine the location and width of the beam of light projected on the road as transmitted by scanning reflector 44. The drive 60 of motor 48 is connected at the horizontal centerline axis of scanning reflector 44 to oscillate the reflector through a plus and minus angular excursion relative to a horizontal plane such as a horizontal plane through the horizontal centerline. The angular excursion of scanning reflector 44 corresponds to the angular excursion of scanning reflector 10 of FIG. 3 as generated by transducer 18 and the angular excursion of reflector 42 corresponds to the angular excursion of reflector 10 in FIG. 2 as generated by transducer 20.

The angular excursion of scanning reflector 44 determines the location and length of the beam of light projected on the road in front of the vehicle. In both embodiments of FIGS. 4 & 6 intensity of the projected beam of light will depend on the dwell on each segment of projected light. In order to shift from a high to low beam, the angular excursion of scanning reflector 44 may for example be changed from plus and minus ten degrees to plus five degrees and minus ten degrees with respect to a horizontal reference plane. The aim of the beam of light projected on the road in front of the vehicle may be also changed by oscillating the beam relative to a second reference plane which if depressed relative to the horizontal reference plane will lower the projected beam on the road. The width and location of the beam of light may be changed by changing the angular excursion of scanning reflector 42 as previously described for scanning reflector 10. Increasing the angular excursion will increase the width of the project beam and a change from an angular excursion of plus and minus ten degrees to plus five and minus ten degrees relative to the vertical plane of reflective surface 54 will change the location and width of the projected beam.

Figure 9:
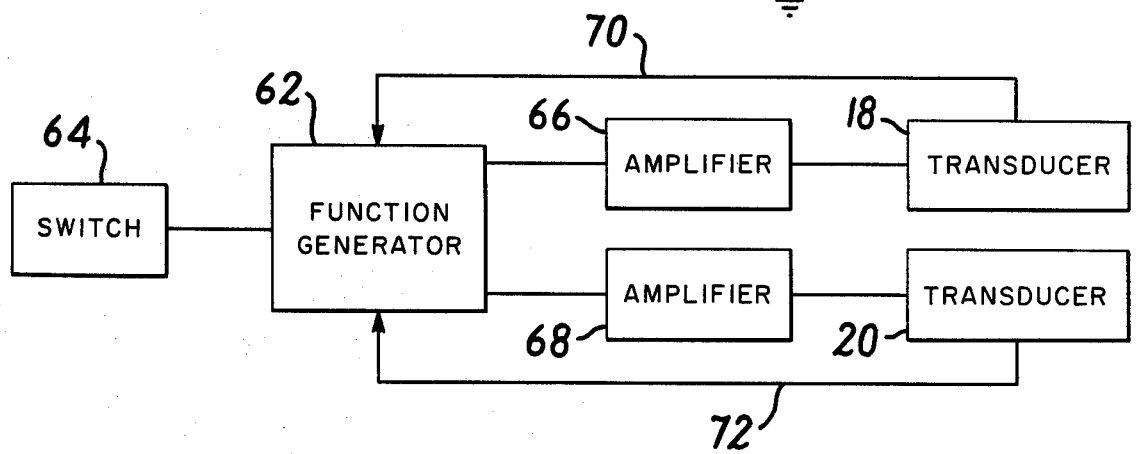
FIG. 9 illustrates one convenient way to control oscillation and aim of the scanning reflectors by means of a function generator.

Any conventional driver means may be used to change the angular excursion and operation of the scanning reflectors. One form of driver means which is a conventional function generator 62 actuated by a multiposition switch 64 is illustrated in FIG. 9. The selected function generator is a free running internally synchronized generator that selectively produces two separate signals each of which is transmitted to a conventional amplifier such as the current amplifiers 66 and 68 respectively which in turn transmit the signals to the respective transducers 18 and 20 or to the respective corresponding galvanometric motors 44 and 42. For best results there is a conventional feedback loop 70 and 72 from each oscillator 18 and 20 respectively which feeds a position signal back to the function generator to provide start and end signals for the function generator. The selected transducers 18 and 20 are of the type having reciprocating coil motors and the feed back signal is generated by a sensor that monitors the voltage induced in the transducer coil.

The multiposition switch, in one position will actuate the function generator to drive the transducers in one mode such as to move the scanning mirrors through an angular excursion of plus and minus ten degrees relative to particular reference planes. Shifting the multiple position switch to a second position will cause the function generator to drive a selected transducer such as transducer 18 in a second mode of operation to change the angular excursion from plus and minus ten degrees to plus three degrees and minus ten degrees to shift from a high to low beam projected on the road. Alternatively the shift from high to low beam may be effected by changing the aim of the beam. In such case if the high beam is generated by an angular excursion of plus and minus ten degrees relative to the horizontal plane through centerline 26 in FIG. 3 for one position of switch 64, the function generator in the second position of switch 64 may cause the transducer 18 to cause the scanning reflector to move through an angular excursion of plus and minus ten degrees relative to a reference plane tilted down at an angle of thirty degrees below the horizontal reference plane through the centerline 26. In such case the length of the projected beam in the road remains the same but it is moved back closer to the vehicle for low beam operation. Various other desired modes of operation are effected by means of different positions of the multiposition switch 64. The function generator 62 has a conventional logic circuit (not shown) or other known means that dictate different modes of operation for each position of switch 64. The logic circuit may in response to electric signals change the mode of operation of the function generator for a given operative position of switch 64.

Figure 7:
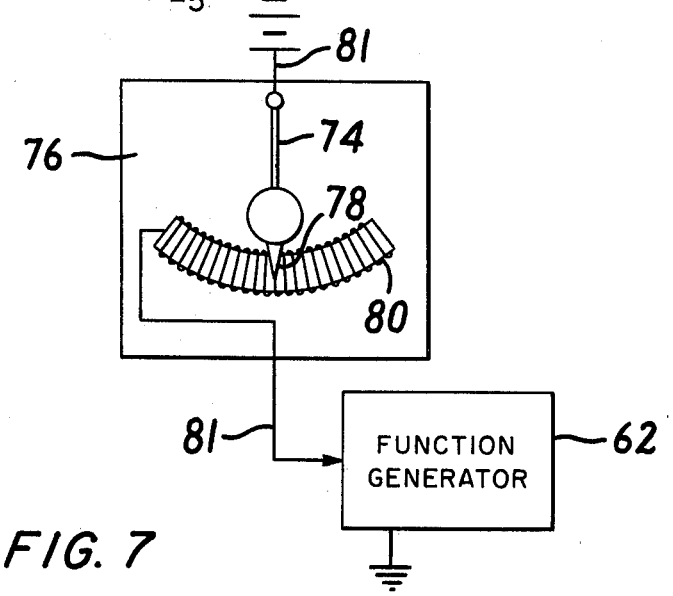
FIG. 7 illustrates one way in which a gravity pendulum may be used to compensate for change in attitude of a rear end loaded vehicle or of a vehicle topping a hill.
Figure 8:
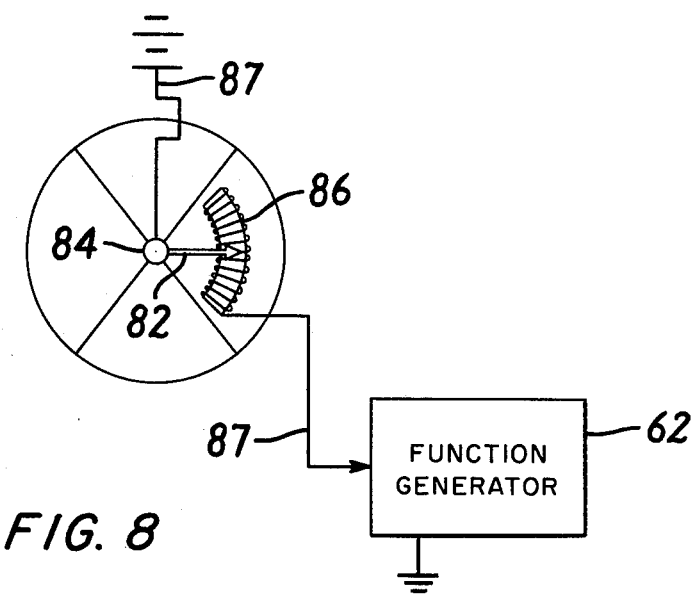
FIG. 8 illustrates one way to change the aim of the vehicle headlamp to follow the road around curves.

For example, FIG. 7 illustrates a gravity pendulum 74 suspended from the top of a housing 76. The pendulum has a wiping contact at 78 and a resistance 80 in a conventional electric circuit that includes the function generator as indicated at 81. The housing 76 is attached to the body of the vehicle in any convenient manner preferably toward the front or rear of the vehicle body. When the attitude of the vehicle body with respect to the road is changed as by a heavy rear load or in topping a hill, the projected headlamp beam will tend to tilt up. The gravity pendulum compensates for this tilting.

When the attitude of the vehicle body changes, the gravity pendulum swings away from its normal position to increase the resistance in circuit 81 and generate a signal that is transmitted to the logic circuit of the function generator which will respond to the magnitude of the change in signal to lower the aim of the projected beam and compensate for change in attitude of the vehicle body and headlamps. The angular excursion of the scanning reflectors remains the same as set by the position of switch 64. The signal from the gravity pendulum causes the function generator to shift the reference plane of the angular excursion of the scanning reflectors generated by transducer 18 and galvanometric motor 48 in order to lower the aim of the projected beam. Similarly a decrease in resistance of circuit 81 caused by the gravity pendulum swinging away from its normal position in the other direction will generate a signal to the logic circuit that will raise the aim of the beam.

Automatic compensation of the aim of the projected beam when rounding curves is achieved by means of a contact arm 82 that rotates with the steering post 84 to make a wiping contact with a resistance 86 in an electric circuit 87 which transmits signals to the function generator 62. When the steering post rotates to turn the wheels, the wiping contact changes the resistance in the circuit. This transmits a signal to the function generator 62 which responds to the magnitude of the signal to change the reference plane of angular excursion and shift the aim of the projected beam right or left depending on curves in the road.

Figure 10:
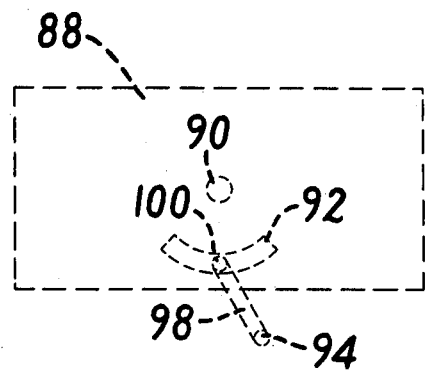
FIG. 10 illustrates in dotted lines one way in which the aim of the headlamp beam may be changed by manual driver means.

One way in which the aim of the projected beam may be changed manually by mechanical means is illustrated in dotted lines in FIGS. 1 and 10. As there shown, the scanning reflector 10 and transducers 18 and 20 are mounted on a plate 88 pivotally mounted at 90. The plate is provided with a cam slot 92. A flexible cable 94 extends from the dashboard (not shown) into the housing for the headlamp where it is slidably mounted by bracket 96. A lever arm 98 fixed to the cable carries a cam 100 which is slidably retained in conventional manner in cam slot 92. When the flexible cable is pulled up (as viewed in FIG. 1) by a suitable control knob on the dashboard, the plate will tilt on its pivot and raise the aim of the projected beam of the headlamp and when the cable is pushed down the plate will tilt in the other direction to lower the beam of the headlamp. The flexible cable enables the driver to control the aim of the beam and set it in the high or low or in any desired intermediate position. Rotation of the control knob will rotate the cable and lever arm and slide the keeper cam 100 in slot 92 to rotate the aim of the projected beam to the right or left depending on the curve in the road. Manual control of the aim of the beam may be used without any electric controls such as the function-generator 62 in which case the speed of oscillation and angular excursion of the scanning reflector remains constant. Alternatively, a function-generator as other conventional electric control may be employed to change the speed of oscillation and angular excursion and used in combination with a mechanical manual control for shifting the aim of the beam.

In FIG. 1 the scanning reflector 10 is supported by connection to the transducers 18 and 20 at the centerlines of the reflector. This is not necessary and the supports may be located in any convenient position. If desired a single conventional pivotal support may be used and it is not necessary to support the scanning reflector by means of the transducers as illustrated in the drawings. In the description the scanning reflector is oscillated relative to its vertical and horizontal axis and while this is preferred, the reflector may obviously be oscillated with respect to any desired axis with the same results. It will be obvious to those of ordinary skill in the art that the scanning reflector may have a reflective surface on both sides and be rotated through 360° instead of being oscillated in order to achieve the same results.

It will be understood that the invention is not to be limited to the preferred embodiments herein chosen for illustration and the claims are intended to cover all changes and modifications falling within the spirit and scope of the invention.

I claim:

1. A vehicle headlamp comprising a housing, means for generating a collimated beam of light in said housing, light reflective means mounted for predetermined oscillating movement, said light reflective means intercepting and scanning said collimated beam of light in said housing to project an apparently continuous beam of light from said housing, first means coupled to said light reflective scanning means and mounted for oscillating said light reflective scanning means about a first axis and second means coupled to said light reflective scanning means and mounted for oscillating said light reflective scanning means about a second axis positioned at a predetermined angle with respect to said first axis, said first and second oscillating means controlling the dimensions of said resulting continuous beam of light.

2. The vehicle headlamp of claim 1 in which the means for projecting a collimated beam of light includes a source of light and a reflector that projects a collimated beam of light to said light reflective scanning means and wherein said first oscillating means is mounted for oscillating said light reflective scanning means about a vertical axis and said second oscillating means is mounted for oscillating said light reflective scanning means about a horizontal axis.

3. The vehicle headlamp as claimed in claim 2, wherein said light reflective scanning means includes a single planar reflector, wherein said first oscillating means pivots said reflector about said vertical axis through an angular excursion of about plus and minus five degrees and wherein said second oscillating means pivots said reflector about said horizontal axis through an angular excursion of about plus and minus five degrees.

4. A vehicle headlamp comprising a housing, a source of light in said housing, a scanning reflector, a stationary reflector positioned to project a collimated beam of light from said light source to said scanning reflector and means for oscillating said scanning reflector at a predetermined cyclic rate for projecting an apparently continuous beam of light from said housing, said oscillating means including first means for oscillating said scanning reflector about a vertical axis and second means for oscillating said scanning reflector about a horizontal axis, said first and second oscillating means controlling the width and height, respectively, of said resulting continuous beam of light.

5. The vehicle headlamp of claim 4 in which the means for moving siad scanning reflector comprises a pair of transducers.

6. The vehicle headlamp of claim 4 which includes driver means selected from the group consisting of a function generator, servo-motors, magnetic tape and manually operated mechanical linkage for changing the mode of operation of said scanning reflector.

7. A vehicle headlamp comprising a housing, a source of light in said housing, a scanning reflector, a stationary reflector positioned to project a pin point collimated beam of light from said light source to said scanning reflector and means for moving said scanning reflector in a raster pattern to effectively cause said pin point collimated beam to be moved across the surface of said scanning reflector in a plurality of horizontal parallel lines for projecting an apparently continuous beam of light from said housing, said moving means including first means for oscillating said scanning reflector about a vertical axis and second means for oscillating said scanning reflector about a horizontal axis.

8. The vehicle headlamp of claim 7 in which the means for moving the scanning reflector in a raster pattern comprise a function generator and a pair of transducers for oscillating said scanning reflector in a raster pattern.

9. The vehicle headlamp of claim 8 which includes a gravity pendulum and an electric circuit with variable resistance connected to said function generator, said gravity pendulum upon change in position generating an electric signal by changing the resistance in said circuit to change the mode of operation of said function-generator to raise and lower the aim of said headlamp.

10. The vehicle headlamp of claim 8 in which the function-generator is controlled by a multiposition switch which changes the mode of operation of said function-generator with change in switch position.

11. The vehicle headlamp of claim 8 which includes an electric circuit means connected to said function-generator and means for generating an electric signal in said circuit means to change the mode of operation of said function generator.

12. The vehicle headlamp of claim 11 in which the means for generating an electric signal in said electric circuit means comprise a resistance in said circuit and a mechanical linkage connected to the vehicle steering means for changing the resistance in said circuit upon change in position of said steering means to generate said signal.

13. The vehicle headlamp of claim 1 in which the light reflective means for scanning said collimated beam of light comprises first and second scanning reflectors, said first scanning reflector being pivotal about one of a horizontal and vertical axis to scan said collimated beam of light and project the scanned beam to said second scanning reflector, said second scanning reflector being pivotal about the other of said horizontal and vertical axis, and further including means for pivoting said first and scanning reflectors about said respective axes and control means for controlling the operation of said pivoting means.

14. The vehicle headlamp of claim 1 which includes means for changing the mode of operation of said light reflective means for scanning said collimated beam of light.

15. The vehicle headlamp of claim 14 in which the means for changing the mode of operation of said light reflective means for scanning said collimated beam of light comprises a pivotal mount for said light reflective scanning means and a flexible cable connected to said pivotal mount to change the position of the mount and mode of operation of said scanning means.

* * * * *